United States Patent [19]

Amberg

[11] 4,355,759
[45] Oct. 26, 1982

[54] COMPOSITE CONTAINER AND METHOD

[75] Inventor: Ralph G. Amberg, Toledo, Ohio

[73] Assignee: Automated Container Corporation, Orlando, Fla.

[21] Appl. No.: 81,960

[22] Filed: Oct. 4, 1979

Related U.S. Application Data

[63] Continuation-in-part of Ser. No. 896,251, Apr. 14, 1978, abandoned.

[51] Int. Cl.$^3$ .............. B65D 3/10; B65D 5/00; B65D 13/00
[52] U.S. Cl. .............. 229/5.5; 229/3.5 R; 229/4.5; 220/359
[58] Field of Search .............. 229/4.5, 5.5, 3.5 R, 229/5.6; 206/508; 220/359

[56] References Cited

U.S. PATENT DOCUMENTS

| | | | |
|---|---|---|---|
| 2,735,604 | 2/1956 | Zerlin | 229/5.5 |
| 3,383,026 | 5/1968 | McGee | 229/5.5 |
| 3,880,288 | 4/1975 | Hunter | 206/508 |
| 3,899,117 | 8/1975 | Peyser et al. | 229/5.5 |
| 3,912,154 | 10/1975 | Godar | 229/5.5 |

FOREIGN PATENT DOCUMENTS

| | | | |
|---|---|---|---|
| 732012 | 4/1966 | Canada | 229/5.5 |
| 732455 | 4/1966 | Canada | 229/5.5 |
| 475136 | 8/1969 | Switzerland | 229/5.5 |
| 479059 | 1/1938 | United Kingdom | 229/5.5 |

Primary Examiner—Joseph Man-Fu Moy
Attorney, Agent, or Firm—John R. Nelson; Myron E. Click; David H. Wilson

[57] ABSTRACT

An improved composite container, and method of forming same, which incorporates a unique plastic end which is compression molded into bonded engagement with a composite container body. The plastic end is formed from a like material which forms the inner or outer lining on the composite container body so as to form a leak-proof seal between the plastic end and the composite container body.

1 Claim, 5 Drawing Figures

COMPOSITE CONTAINER AND METHOD

RELATED APPLICATION

This application constitutes a continuation-in-part of application Ser. No. 896,251 filed Apr. 14, 1978, now abandoned.

BACKGROUND OF THE INVENTION

This invention relates to containers and a method of fabricating same. More particularly, it relates to a container which is constructed of relatively low-strength materials and which is well-suited for packaging products requiring a liquid seal. It is desirable to have an inexpensive container suitable for packaging liquid products such as petroleum products. Suitable containers for such petroleum products as motor oil have involved the use of relatively expensive metal cans with metal ends.

In recent years there have been introduced a number of different types of light-weight composite containers constructed of low-strength materials which are considerably less expensive than comparable metal containers formed from tin plate or aluminum. Such inexpensive containers normally are comprised of a cylindrical laminated fiber body which is closed at both ends by metal caps which are attached to the fiber body by a standard double-seaming method. In this commonly used double-seaming method, a curved extension of the metal end is folded over with a flange portion on the fiber body so as to form a double-seamed joint. Such standard fiber or composite containers have experienced difficulty in packaging liquid products, such as motor oil, for long periods of time due to the inherent possibility of leakage in the area of the double-seamed joint between the fiber body and the metal end. Thus, because fiber containers are considerably less expensive than comparable metal containers, there has been significant need for an improved composite container which would be well-suited for packaging high volume liquid products such as motor oil.

It is, therefore, an object of this invention to provide an improved composite container which features a plastic end which is compression-molded into bonded engagement with a composite container body or side wall. In the prior art various processes are available for the formation of plastic containers and for the application of a bottom to a plastic container. Examples of such apparatus and processes include U.S. Pat. Nos. 2,710,986 (R. F. Gray), 3,383,026 (A. L. McGee), 3,670,066 (E. I. Valyi), 4,014,970 (H. A. Jahnie). and British Pat. No. 1,518,811. However, none of these patents disclose a composite container which incorporates a plastic end member which has been compression-molded into sealing engagement with the composite container body.

SUMMARY OF THE INVENTION

In general, this invention provides an improved composite container, and method of forming same, which incorporates a plastic end which is compression-molded into bonded engagement with the composite container body to provide a relatively inexpensive container for liquid products. It is suggested that the plastic end be formed from a material identical to that which is used as the inner or outer lining of the composite container body or side wall so as to form a bond or seal therewith. In practice, this improved composite container is formed by dropping a gob of hot plastic material into a molding cavity, bringing the composite container body by means of a mandrel into the molding area and then forming the plastic end by compression-molding it across the open end of the composite container body and into bonded engagement with the body. Other objects, features and advantages of this invention will become obvious to those skilled in the art upon reference to the following detailed description and the drawings illustrating preferred embodiments thereof.

IN THE DRAWINGS

DESCRIPTION OF THE PREFERRED EMBODIMENT

Figure 1:
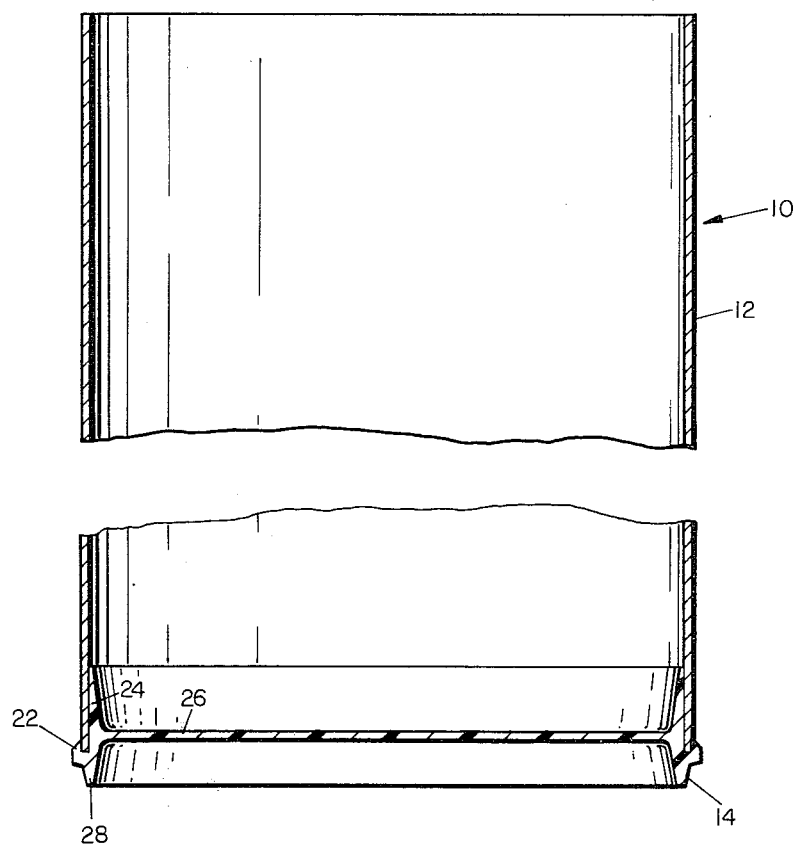
FIG. 1 is a vertical sectional view of an improved composite container constructed in accordance with this invention.

In FIG. 1, a cylindrical composite container is identified generally by the numeral 10. The container 10 comprises a generally cylindrical composite container body or side wall 12 and a pair of end closure members, one of which is formed from plastic and is identified by the numeral 14. As is well known, the composite can body or side wall 12 is comprised of a multiplicity of layers which combine to give it the features necessary to contain the particular product being packaged. In this particular instance, the main body wall 16 may be formed from laminations (not shown) of 1–1.5 mil of paper, such as a number of layers of can stock grade natural kraft liner board. An outer label 18 is provided and may be formed from a combination of aluminum foil covered by a high gloss paper which serves as a decorative label. Alternatively the outer ply of the laminated body wall 16 may be formed from a film, sheet or coating of a thermoplastic material such as p.v.c.., polyethylene, polypropolene or an acrylonitrite. The particular plastic selected will depend on the strength, permeability and printability characteristics desired for such outer layer. The inner liner 20 may similarly be formed from any of a number of suitable plastic materials, one of which would be a 0.7 mil layer of high-density polyethylene.

Figure 2:
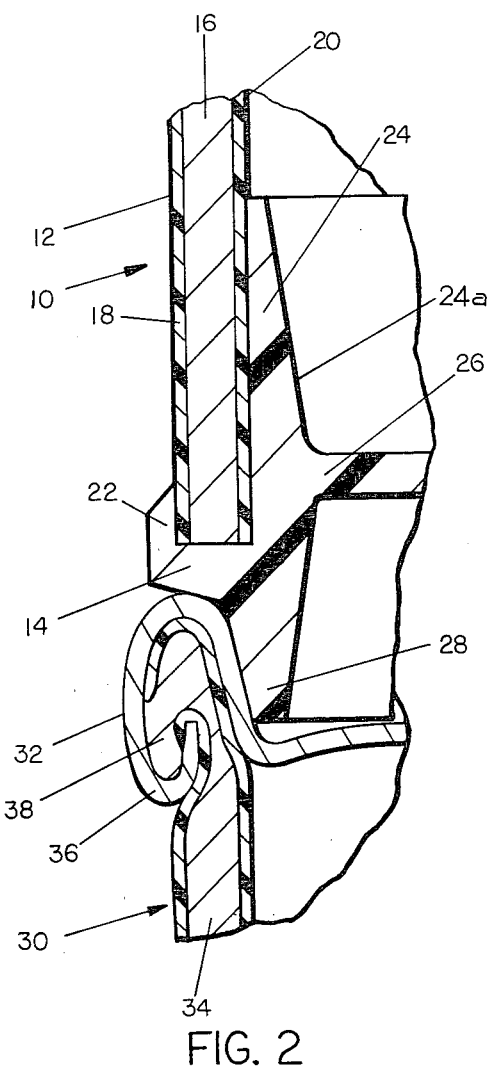
FIG. 2 is an enlarged partial sectional view of the improved composite container of FIG. 1 incorporating the plastic end of this invention, showing the container of this invention stacked on top of another such container.

As can be seen in FIG. 2, a plastic end member 14 is formed to engage the composite can body wall 12 and seal this particular end of the composite container 10. The plastic end member 14 includes an outer upstanding annular ridge 22, an inner annular reinforcing ridge portion 24, central panel 26, and a depending annular stacking member 28. It is suggested that the plastic end member 14 be formed from the same material as the inner liner layer 20 so that a natural bond occurs between the inner ridge portion 24 and the inner liner layer 20. A preferred material for the plastic end member 14 is high-density polyethylene. Any other thermoplastic material may be used that is thermally bondable to liner layer 20. The inner wall 24a of ridge 24 is tapered to provide convenient mold release.

Also shown in FIG. 2 is a second composite container 30 in stacking relationship to container 10. Container 30 has a metal end portion 32, which is attached and double-seamed to the body wall 34. The metal end closure 32 includes an elongated outer curl 36 which is wrapped around and double-seamed with an elongated flange 38 on the composite can body wall 34. It should be understood that a metal can end, such as that illustrated at 32, may be utilized on the end of the composite container 10 which is opposite from that which incorporates the plastic end member 14. Thus, the composite container 10 may incorporate a standard metal end which is double-seamed into engagement with the body wall at its upper end and, at the lower end the unique plastic end member 14 is compression-molded into contact with the body wall and forms a seal with the inner liner of the body wall at its lower end.

Figure 3:
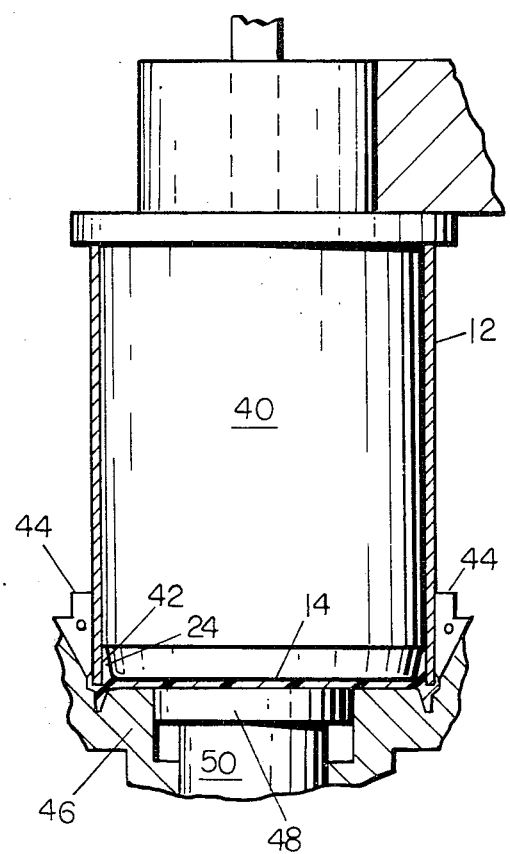
FIG. 3 is a schematic partial sectional view of the molding apparatus which is utilized to form the plastic end means and bond it into engagement with the composite container body.

The method of forming the plastic end member 14 can best be understood by reference to FIG. 3. The container body wall 12 is positioned around a mandrel 40 which has a tapered end portion 42. The container body wall 12 and mandrel 40 are moved into a mold area defined by a plurality of mold members 44, 46 and 48. The mold members 44 and 46 combine to form a cavity to create the outer flange 22, the stacking member 28 and a portion of the annular panel 26 of the plastic end member 14. These mold members 44 and 46 are retractable from engagement with the fiber can body 12 to allow for movement of the can body 12 and mandrel 40 into and out of the mold area. The mold member 48 is mounted for retraction on a piston 50 and combines with a portion of the annular mold member 46 to form the panel 26 of the plastic end member 14.

Thus, when it is desired to form the plastic end member 14 on the can body 12, a gob of plastic material is dropped onto the circular mold member 48. The mandrel 40 with a suitable can body 12 positioned thereon is moved into the mold area. As the respective mold members 44, 46 and 48 are moved into the positions shown in FIG. 3, pressures in excess of 100 p.s.i., and preferably from 200 to 500 p.s.i., are developed in the plastic gob and the gob of plastic material is thereby caused to flow to fill the open spaces defined by the mold members and thereby form, by means of compression-molding, the plastic end member 14. It should be noted that the tapered end portion 42 on the mandrel 40 facilitates the formation of the inner annular ridge portion 24 which becomes bonded with the inner liner 20 on the can body 12 thereby forming an effective seal between the can body 12 and the plastic end member 14. It is suggested that a suitable material for the plastic end member and the lining of the interior of the can body is high-density polyethylene. It is suggested that such material be heated to a temperature in the range of 390° F. to 410° F. prior to depositing a gob of such material onto the mold member 48. After performing the compression molding, the material is allowed to cool and the respective mold members may be retracted, thereby leaving the compression-molded plastic end member 14 in sealed engagement with the container body 12 which may then be retracted from the mold area with the mandrel 40.

Thus, the subject invention provides a unique method for forming an improved composite container which incorporates a novel plastic end which is compression-molded into bonded engagement with a composite can body. The compression-molded plastic end is formed from the same material which forms the inner lining of the composite can body, or a material that is thermally bondable thereto, so as to form a leak-proof seal between the plastic end and the composite can body. The opposite end of the composite can may be closed by utilizing another plastic end or a standard metal end which is double-seamed into engagement with the composite can body wall. It has been found that the improved composite container of this invention which incorporates a unique plastic end is less expensive, stronger and provides a better seal than a composite container which utilizes metal end members on both of its extremities. In addition, as can be seen in FIG. 3, the annular stacking member 28 is sized and shaped so that it will nest within a standard metal end closure or within another identical plastic end so as to provide a convenient stacking feature with other composite containers.

Since both upstanding ridges 22 and 24 are formed under pressures in excess of 100 p.s.i. they compress and reinforce the adjacent end portions of side wall 12. Preferably the combined radial thicknesses of the two ridges equals or exceeds that of the original thickness of side wall 12. The height of ridge 24 preferably is at least four times the original thickness of the composite side wall.

Figure 4:
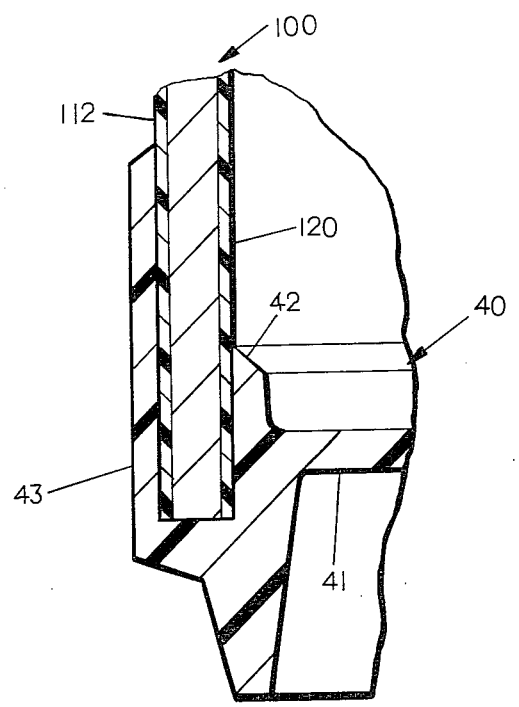
FIG. 4 is an enlarged partial sectional view of a modified form of improved composite container fabricated in accordance with the method of this invention.

Referring now to FIG. 4, there is shown a modified container construction embodying this invention wherein the outer layer 112 of the composite container side wall 100 is formed from a sealable thermosplastic material. The modified end wall of closure 40 comprises a central panel portion 41 having an annular upstanding ridge portion 42 immediately adjacent the inner wall of the container side wall 100. Radially spaced from wall 42 is another upstanding annular ridge 43 which is of significantly greater axial extent than the ridge 42, on the order of four times the original thickness of side wall 100.

The entire closure 40 is formed by compression molding of a gob of thermoplastic material in an apparatus of the type schematically illustrated in FIG. 3 and in accordance with the method heretofore described, and the material from which the modified closure 40 is formed is of a type that is heat sealable with the outer thermoplastic layer 112 provided on the composite container side wall 100. Thus again, the end wall of the container is integrally united to the side wall by virtue of the aforementioned heat seal accomplished under substantial pressure. More importantly, the enclosure of the end portions of the side wall 100 between the two upstanding annular ridges 42 and 43 insures that the end of the container is far more rigid and less susceptible to deformation or crushing than any other prior art construction employing thermoplastic end wall members. Preferably the combined thickness of the two radially spaced container wall engaging ribs 42 and 43 is substantially in excess of the thickness of the composite container wall.

Those skilled in the art will recognize that an inner thermoplastic layer 120 could be applied to the inside surface of composite container side wall 100 and also be sealed to the upstanding wall 42 in the compression molding operation, if this additional security is required. Thus, by achieving a bonding of the two relatively rigid annular ridges 42 and 43 to the opposed surfaces at the bottom end portions of the container wall 100, not only is a stronger container obtained, but one which is less susceptible to leakage, and which can be manufactured at significantly less cost than conventional containers employing aluminum, tin plate or injection molded plastic end wall members.

In each modification of this invention heretofore described, it is the employment of high pressure compression molding to effect the bonding of the thermoplastic end wall to the composite side wall that provides the uniquely desirable characteristics of the resulting container. Such compression molding inherently generates compressive forces on the end portions of the composite side walls of the container well in excess of 100 psi. In fact, the compressive forces generated on the composite side wall 12 in the modification of FIG. 1 is sufficient to cause a literal impregnation of the fibrous materials by the adjacent molten thermoplastic materials (see FIG. 5). For example, the thermoplastic material from the end wall 14 impregnates the end face 16c of the paper laminations 16, while end portions of the thermoplastic liner 20 are melted and forced into the adjacent side walls of laminations 16. Thus, a thermal bond is achieved which far exceeds in both strength and elimination of leakage the thermal bonds achieved in prior art processes and machines.

Figure 5:
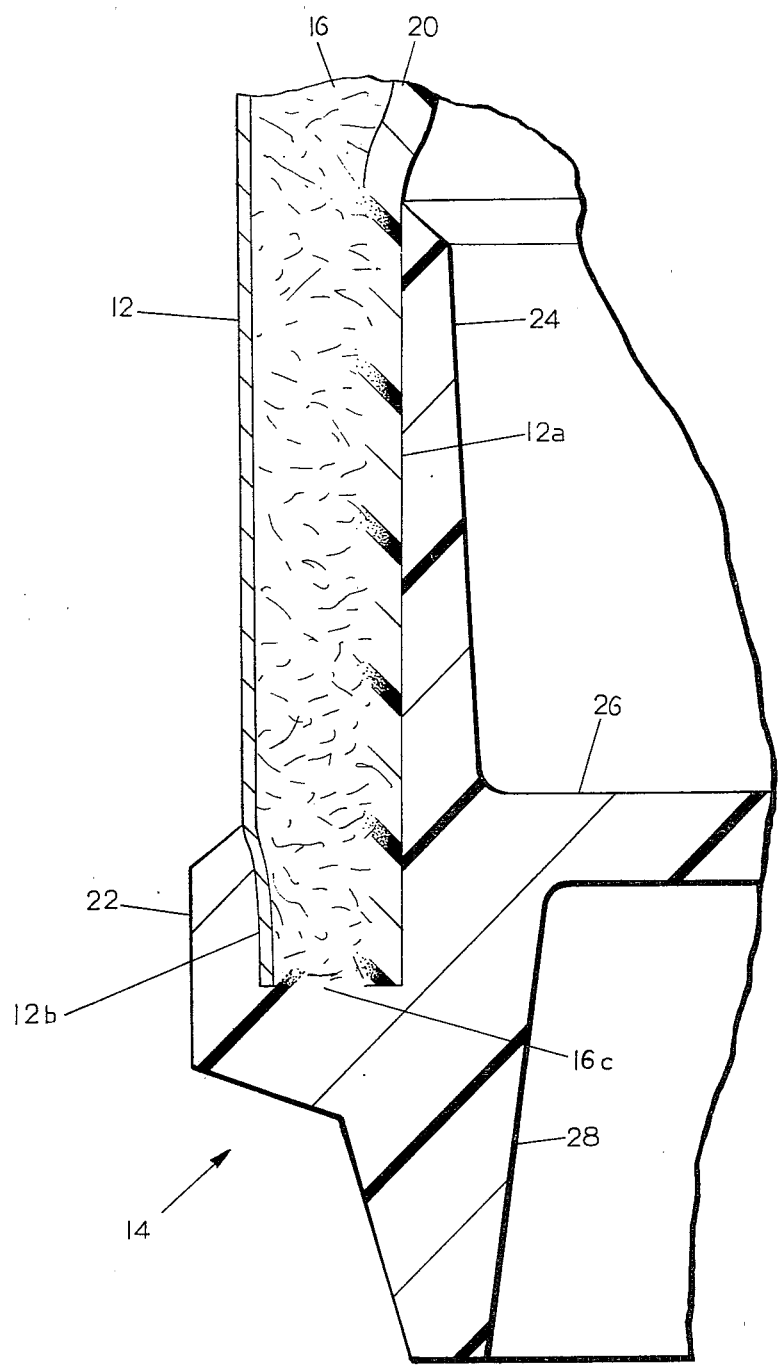
FIG. 5 is an enlarged view of a portion of FIG. 1.

Lastly, it should be noted that the extreme axial end portions of the composite side wall are significantly compressed by the described compression molding method. Referring to FIG. 5, the resulting reduced thickness end portion 12a is clearly indicated and involves a compressive reduction in thickness of the end portions of the fibrous laminations of side wall 12 of up to 10 percent and a comparable increase in strength. A higher degree of compression of the extreme axial end portions 12b of the composite container side wall 12 lying between ridges 22 and 24 is obtained. Such compression, together with the impregnation of the fibrous laminations by the thermoplastic material greatly increases the resistance of such side wall to any forces tending to produce an inward or outward buckling of the end portions of the container side wall 12.

The described method of concurrently forming an end wall member for a composite container and achieving the thermal bonding of such end wall member to the side wall member by a compression molding operation provides unique advantages over the prior art constructions. For example, if the end wall member 14 were separately formed by an injection molding process and then, in a second operation, secured to the axial end portions of the composite container side wall 10 through the mere application of heat to the contiguous areas of the thermoplastic liner 20 and the upstanding flange 24, you could obtain a composite container having a thermoplastic end wall bonded to a composite fibre side wall, but this is an artificial similarity. As is well known to those skilled in the art, any injection molded thermoplastic member necessarily has a gate area at which the thermoplastic material is injected under high pressure into the molding cavity. It is equally well known that such gate area incorporates residual stresses and, when exposed to many liquid products, particularly oil based products, the gate areas of such injection molded closures are subject to failure due to stress cracking.

More importantly, it would be very difficult, as well as time consuming in a commercial manufacturing operation, to achieve a thermal bond of the upstanding thermoplastic annular ridge 24 of any separately formed closure 14 to the adjacent portions of the thermoplastic liner 20, with the concurrent application of a high compressive force.

It should also be recognized that the end portion of the side walls of a composite container is essentially never a perfect cylinder. Such container side walls are conventionally formed by spirally wrapping a plurality of laminations upon an arbor and then cutting the wrapped material into container lengths by cutting wheels or knives. The elements are often oval. The cutting action often produces a relatively ragged or deformed edge portion. Moreover, the subsequent handling of the severed container body elements provides opportunity for the axial end portions to be dinged inwardly or bulged outwardly. All of these structural defects are overcome and accommodated when the end wall member is formed and bonded to the composite side wall by the method of this invention. The compression molding process inherently accommodates any and all deviations of the axial end portion of the composite side wall from a true cylinder and forms the end wall around such deformations. It follows that a unique container is produced which cannot be duplicated by separately injection molding or otherwise forming the end wall member and then achieving the thermal bonding of the separate end wall member to the axial end of the side wall of the composite container.

It has been additionally suggested in the prior art, for example, in U.S. Pat. No. 3,383,026 to McGee and British Pat. No. 1,518,817 to the Mead Corporation, that an end wall for a composite container could be produced by vacuum forming a thin plastic film around the end wall portions of the composite side wall of such container and achieving a thermal bond of the film forming the end wall to a thermoplastic outer layer on such container side wall. As is well known to those skilled in the art, vacuum forming operations can only be successfully performed on relatively thin sheets of thermoplastic material. Hence the thickness of a container end wall formed in this fashion would be severely limited. More importantly, the vacuum forming method is inherently limited to a maximum pressure of something less than 14.7 pounds per square inch and this pressure is in no manner comparable with the pressures achieved in a compression molding operation which are normally in excess of 100 pounds per square inch. Therefore, there is no opportunity in a vacuum forming operation to achieve a compression of an axial end portion of the composite container side wall by the thermoplastic material being formed around and bonded to such side wall. Furthermore, a vacuum forming operation cannot provide spaced upstanding rigid reinforcing ridges, such as ridges 22 and 24, on a vacuum formed end wall or closure member to rigidify the end of the composite container side wall 10 and to provide greatly increased protection against dingeing or bulging of such side wall end. In no event can the vacuum forming operation produce sufficient pressure to cause the thermoplastic material of the thermoplastic liner and the end wall 14 to be driven intimately into the interstices of the fibrous laminations of the composite container side wall, thus providing a far superior bonding of the end wall member to such side wall. It is therefore obvious that a significantly stronger and more leak resistant closure or end wall is assembled to a composite container side wall by the described method of concurrently forming the end wall and bonding it to the side wall by a compression molding operation.

Modifications of this invention will be readily apparent to those skilled in the art. For example, the crosssectional configuration of the container side wall 12 may be rectangular or oval. Similarly the compression molded end wall may be provided with an inwardly or outwardly domed configuration, together with any number and type of reinforcing ridges in the central panel. The compression molding process of producing the end wall of the container provides the utmost flexibility in design of the container end wall, without increasing the cost of manufacture of such end wall.

I claim:

1. An improved composite container comprising a cylindrical body defining a side wall of the container formed of plural laminated layers, the outer layer being aluminum foil covered by high gloss paper to form a label surface, the central layer comprising fibrous material, and the inner layer being comprised of a thermoplastic material, an integral end wall compression molded of the same thermoplastic material as said inner layer of the side wall and thermally bondable therewith, a peripheral flange on said end wall bonded under high pressure of compression molding to an axial end portion of said body side wall inner thermoplastic layer, said end portion of said body side wall being of reduced thickness and enhanced rigidity by the compression of the fibrous laminations during compression molding the end wall, the bonding pressure thereof impregnating the fibrous layer of the lamination by the inner layer of thermoplastic material, a second flange on said end wall parallel to said peripheral flange and compressively engaging the outer layer of said side wall providing a further reduction in thickness of the laminated side wall end portion, the axial height of said peripheral flange being on the order of four times the major thickness of the side wall of the laminated body, said second flange being of lesser axial height than the axial height of said peripheral flange, said second flange and said peripheral flange compressively engaging the reduced thickness end portion of said side wall, and the combined thickness of said peripheral and second flanges exceeding the major thickness of said laminated side wall of the container body.

* * * * *